2371X
2 Sheets—Sheet 1.
J. SMALLMAN
AIR PUMP.
Patented Aug. 29, 1815.
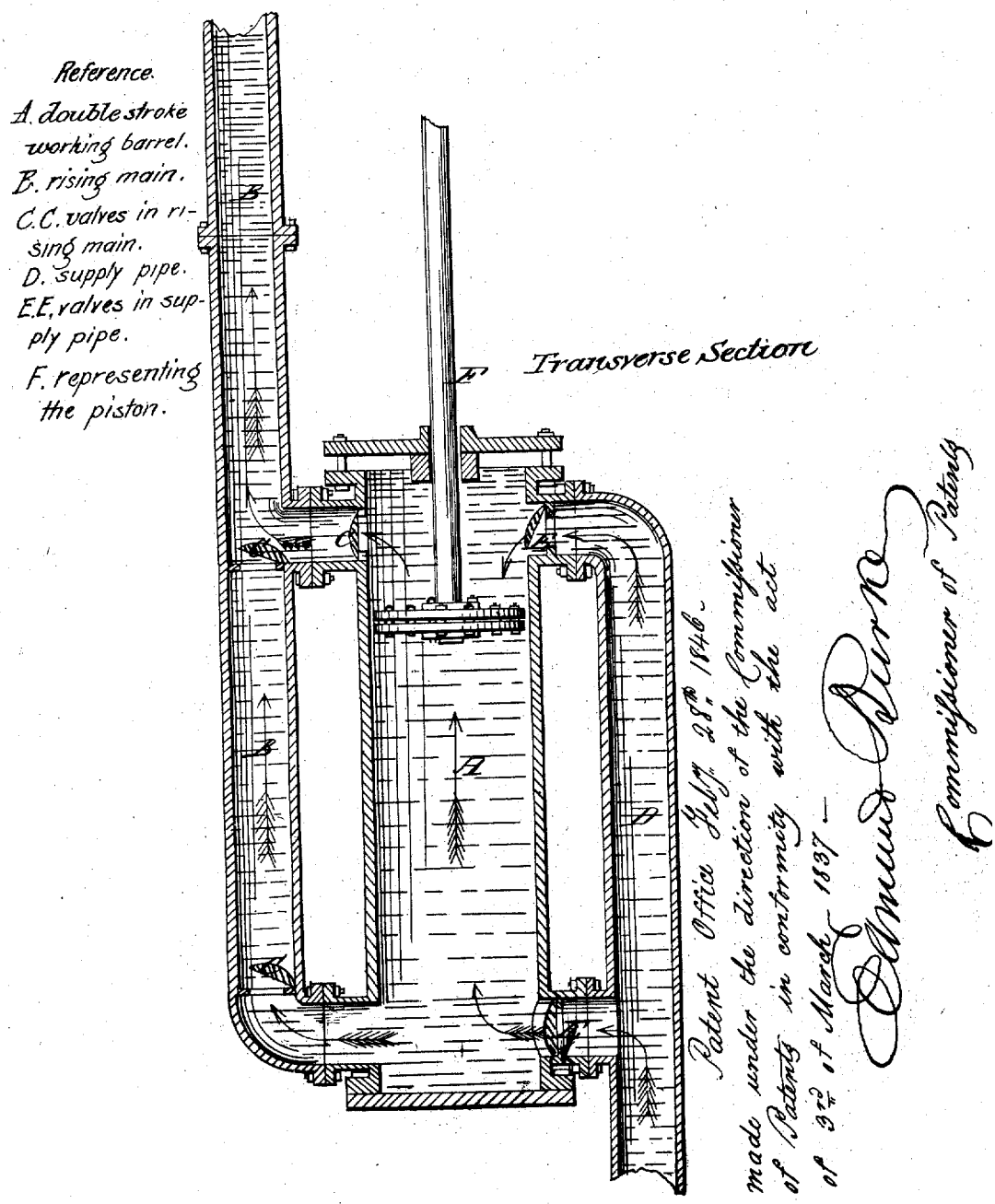

2371X
J. SMALLMAN.
AIR PUMP.
Patented Aug. 29, 1815.
No Printed Specification Available
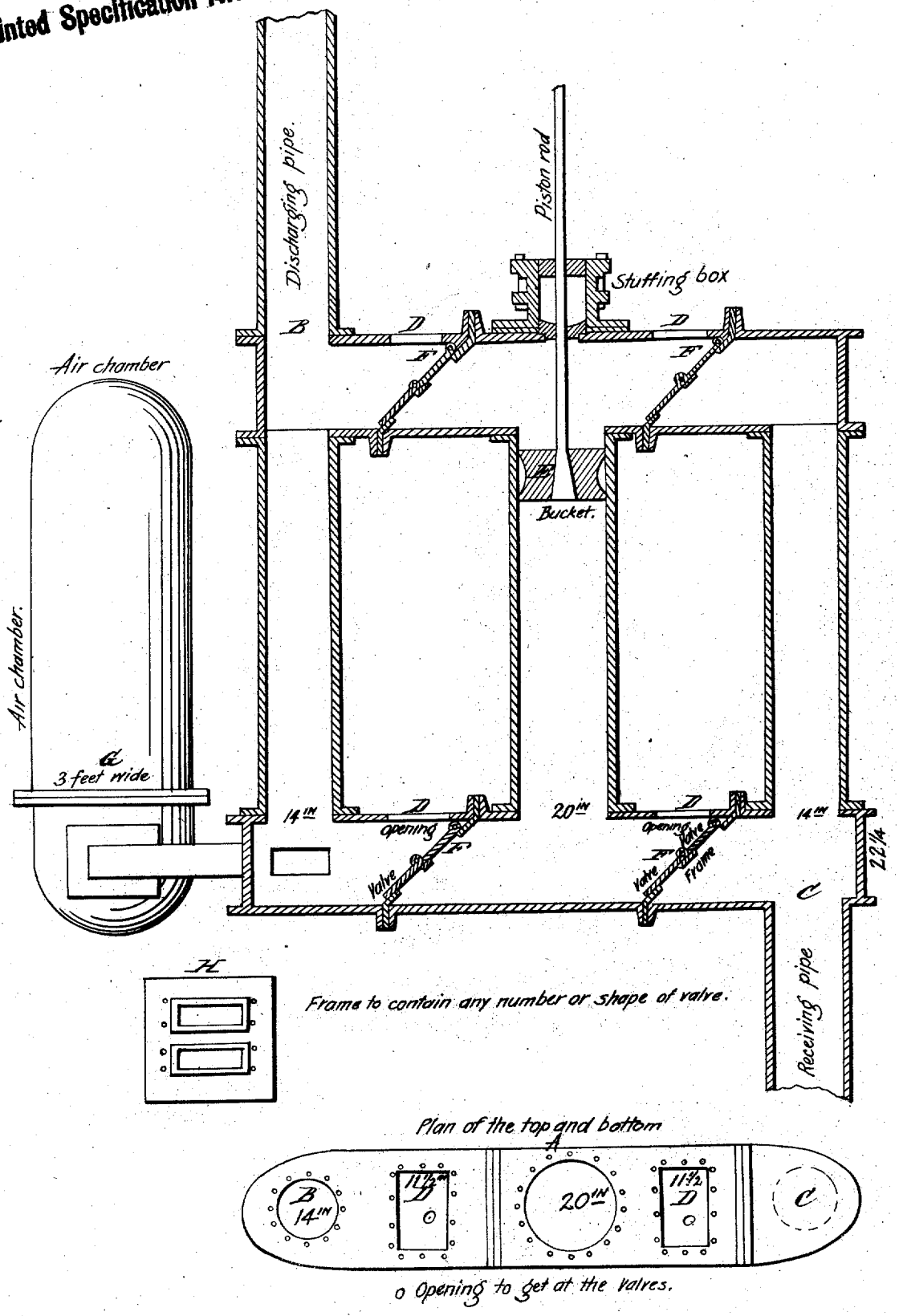

2371X
Aug. 29, 1815

James Smallman
Letters Patent

The Schedule referred to in these Letters Patent, and making part of the Same, containing a description in the words of the said James Smallman himself of his double Air and Water Pump.

---

The principles of this pump are as follows, viz. It works a double Stroke of water in one working barrel by forcing the length of its Stroke of water out below, and the same above, by the use of two or more valves in the rising main. the one at the bottom and the other at the top; and two or more valves, according to the size of the pump, for the suction or supplying pipe. It is so constructed as to work in a perpendicular, or any angle down to 45 degrees, with any number or shape of valves in each opening according to the size of the pump, as the more valves the more easy their motion. It can also be worked with one or more horizontal valves of a conical shape The double Pump works very well either with or without an air vessel; as I have them in actual operation from 3 inches to 20 inches, and from 50 to 98 feet in depth without any aid derived from an air vessel James Smallman Witnesses
A Wilmans
Joseph H. Davis Ex.
[illegible]

(235 words) (Patented August 29th 1815)
Drawing Made [illegible]

To all to whom these Presents shall come, Greeting:
I certify that the annexed is a true copy of a Patent granted to James Smallman for a Double Air Pump for Steam Engines Dated August 29th. 1815.
In testimony whereof, I, Richard Rush, acting Secretary of State of the United States have hereunto subscribed my name, and caused the Seal of the Department of State to be affixed.

Done at the city of Washington, this twelfth day of June A.D. 1849

Richard Rush

Exped.

N.G.

(Seal)